United States Patent
Baek et al.

(10) Patent No.: US 8,009,533 B2
(45) Date of Patent: Aug. 30, 2011

(54) OPTICAL DISC APPARATUS, A METHOD OF PERFORMING AN OPTICAL POWER STUDY OF AN OPTICAL DISC APPARATUS, AND A METHOD OF DETECTING A WRITING POWER OF AN OPTICAL DISC APPARATUS

(75) Inventors: Ji Seon Baek, Suwon-si (KR); Jin Woo Yu, Suwon-si (KR); Hyon Sok Kay, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 928 days.

(21) Appl. No.: 11/703,733

(22) Filed: Feb. 8, 2007

(65) Prior Publication Data
US 2007/0283371 A1    Dec. 6, 2007

(30) Foreign Application Priority Data
Jun. 5, 2006 (KR) .................. 10-2006-0050593

(51) Int. Cl.
*G11B 15/52* (2006.01)
(52) U.S. Cl. .................. 369/47.53; 369/53.27
(58) Field of Classification Search .......... None
See application file for complete search history.

(56) References Cited

U.S. PATENT DOCUMENTS

| | | | |
|---|---|---|---|
| 7,075,863 B2 * | 7/2006 | Fukumoto et al. | 369/44.29 |
| 2004/0151095 A1 * | 8/2004 | Nijboer et al. | 369/47.53 |
| 2004/0156286 A1 * | 8/2004 | Miyaki | 369/47.53 |
| 2005/0213450 A1 * | 9/2005 | Yamada | 369/47.53 |
| 2006/0233070 A1 * | 10/2006 | Kurokawa et al. | 369/44.23 |
| 2006/0274616 A1 * | 12/2006 | Yu et al. | 369/47.53 |
| 2008/0304380 A1 * | 12/2008 | Tasaka et al. | 369/47.53 |

* cited by examiner

*Primary Examiner* — Paul Huber
(74) *Attorney, Agent, or Firm* — Stanzione & Kim, LLP

(57) ABSTRACT

An optical disc apparatus and a method of performing an optical power study and detecting writing power in the optical disc apparatus. An optical pickup includes a light source to emit a laser beam according to an input optical power signal, an optical power detector to detect optical power of the laser beam using part of the laser beam, and an actuator to drive a lens to form a beam spot. To reduce the time required for the power study, a controller positions the optical pickup in a specific area of a disc and applies a predetermined range of optical power signals to the light source to perform the power study to determine its optical power characteristics using the optical power signal and the detected optical power while maintaining the actuator in a driving state in which writing and reading is possible.

16 Claims, 4 Drawing Sheets

OPTICAL DISC APPARATUS, A METHOD OF PERFORMING AN OPTICAL POWER STUDY OF AN OPTICAL DISC APPARATUS, AND A METHOD OF DETECTING A WRITING POWER OF AN OPTICAL DISC APPARATUS

CROSS-REFERENCE TO RELATED APPLICATION

This application claims the benefit of Korean Patent Application No. 2006-50593, filed Jun. 5, 2006 in the Korean Intellectual Property Office, the disclosure of which is incorporated herein by reference.

BACKGROUND OF THE INVENTION

1. Field of the Invention

Aspects of the present invention relate to an optical disc apparatus, a method of performing an optical power study of an optical disc apparatus, and a method of detecting a writing power of an optical disc apparatus, and, more particularly, to an optical disc apparatus, a method of performing an optical power study of an optical disc apparatus, and a method of detecting a writing power of an optical disc apparatus, wherein an optical power study to determine characteristics of a light source according to an inputted optical power signal is performed on a specific area of an optical disc while maintaining a servo in a servo-on state so as to reduce a time required to perform the optical power study.

2. Description of the Related Art

An optical disc apparatus generally includes a laser diode to emit a laser beam toward an optical disc and a photodiode to receive the laser beam reflected from the optical disc so that the optical disc apparatus can write and read data onto and from the optical disc. To this end, the laser diode receives an optical power signal and emits a laser beam with a power corresponding to the optical power signal. Optical power signals corresponding respectively to optical powers are defined in a digital format. Each optical power signal is converted into an analog signal through a digital to analog converter (DAC), which is then applied to the laser diode. The laser diode then emits a laser beam with a power corresponding to the applied analog signal.

One characteristic of the laser diode is that the optical power of the emitted laser beam decreases as a temperature of the laser diode increases. Further, the characteristics of the DAC of each set slightly differ from those of other sets. Since the laser diode and DAC characteristics are, thus, not always uniform from one set to another, to achieve the optimal writing power, performing an optical power study to determine optical power characteristics of the laser diode of the set of interest is necessary. If a rewritable optical disc such as a CD-RW or a DVD-RW is inserted into the optical disc apparatus, the optical power study is performed during a lead-in process of the disc and, if a write-once optical disc such as a CD-R or a DVD-R is inserted, the optical power study is performed when the first write command is input.

There is no need to perform a process of writing or reading test data in the optical power study, which is generally a process of determining optical power characteristics of a laser diode. However, during the optical power study, data written on the optical disc may be damaged by a laser beam emitted as an optical power signal is applied to the laser diode. Accordingly, during the optical power study, the optical pickup including the laser diode is located as far as possible from the optical disc. FIG. 1 is a flow chart of a conventional method of performing an optical power study in the case where the optical power study is performed after a write command is input.

When a write button is pressed after an optical disc is inserted into the optical disc apparatus, a servo provided to perform focusing and tracking control is turned off in order to perform an optical power study (S110 and S120). During the optical power study, an actuator that is provided to drive a lens included in the optical pickup is moved down as low as possible in order to prevent damage to data that is written onto the optical disc. That is, the lens is located as far as possible from the optical disc (S130). The optical power study determines optical power characteristics of the laser diode by checking optical powers of laser beams emitted from the laser diode while sequentially applying a predetermined range of optical power signals to the laser diode (S140). Once the optical power study is completed, the actuator is moved up and the servo is turned on in order to perform Optical Power Calibration (OPC) to detect the optimal writing power (S150 and S160).

In the conventional optical power study method, a long time is required to turn the servo on/off and to move the actuator up and/or down in order to prevent damage to data written on the optical disc during the optical power study. This increases the total OPC time and a lead-in time during which unique information and the like of the inserted optical disc is read and stored.

Where the optical power study is performed after a write command is input, a high-capacity buffer is necessary to store data to be written that is input during the optical power study and the OPC, thereby increasing the manufacturing costs of the apparatus.

SUMMARY OF THE INVENTION

Therefore, aspects of the invention provide an optical disc apparatus, a method of performing an optical power study of optical disc apparatus, and a method of detecting a writing power of the optical disc apparatus, which reduce the time required to perform the optical power study.

In accordance with an aspect of the invention, there is provided an optical disc apparatus to perform recording and/or reproducing operations onto and/or from an optical disc inserted therein, the apparatus comprising: an optical pickup including a light source to emit a laser beam according to an optical power signal, an optical power detector to detect an optical power of the emitted laser beam using part of the emitted laser beam, and an actuator to drive a lens to form a beam spot on the optical disc; a conveyor to move the optical pickup to a location corresponding to a specific area of a recording surface of the optical disc; a servo to control movement of the actuator of the optical pickup; and a controller to control the conveyor so that the optical pickup is positioned in a specific area of an optical disc and to apply a predetermined range of optical power signals to the light source to perform an optical power study so as to determine optical power characteristics of the light source using the optical power signal and the detected optical power while maintaining the actuator in a driving state in which writing and reading is possible.

In accordance with aspects of the invention, the specific area of the optical disc includes a test area where Optimum Power Calibration (OPC) is performed to detect an optimal writing power.

In accordance with aspects of the invention, the specific area of the optical disc includes OPC buffer areas that are arranged at either side of a Power Calibration Area (PCA) that is a test area where OPC is performed to detect an optimal writing power.

In accordance with aspects of the invention, the driving state of the actuator in which writing and reading is possible corresponds to a servo-on state of the servo, and the controller performs the optical power study while maintaining the servo in the servo-on state.

In accordance with another aspect of the invention, there is provided a method of performing an optical power study of an optical disc apparatus comprising an optical pickup, including a light source to emit a laser beam to write and/or read data onto and/or from an optical disc and an actuator to drive a lens to form a beam spot, and a servo to control operations of the optical pickup, the method comprising moving the optical pickup to a specific area of the optical disc; applying an optical power signal to the light source to emit a laser beam to the specific area of the optical disc; and determining optical power characteristics of the light source using the optical power signal and an optical power of the emitted laser beam, wherein the optical power study is performed while maintaining the actuator in a driving state in which writing and reading is possible.

In accordance with aspects of the invention, the specific area of the optical disc includes a test area where Optimum Power Calibration (OPC) is performed to detect an optimal writing power.

In accordance with aspects of the invention, the specific area of the optical disc includes OPC buffer areas that are arranged at either side of a Power Calibration Area (PCA) that is a test area where OPC is performed to detect an optimal writing power.

In accordance with aspects of the invention, the driving state of the actuator in which writing and reading is possible corresponds to a servo-on state of the servo, and the optical power study is performed while maintaining the servo in the servo-on state.

In accordance with another aspect of the invention, there is provided a method of performing an optical power study of an optical disc apparatus comprising an optical pickup, including a light source to emit a laser beam to write and/or read data onto and/or from an optical disc and an actuator to drive a lens to form a beam spot, and a servo to control operations of the optical pickup, the method comprising seeking a test area of an optical disc where test data is to be written to detect an optimal writing power for writing data on the optical disc; applying an optical power signal to the light source to emit a laser beam to the found test area and determining optical power characteristics of the light source using the optical power signal and an optical power of the emitted laser beam; writing the test data; and reading the written test data and detecting the optimal writing power based on quality of the read signal.

In accordance with aspects of the invention, the writing of the test data is performed without seeking the test area after the optical power characteristics of the light source are determined.

In accordance with aspects of the invention, the determination of the optical power characteristics of the light source is performed while maintaining the servo in a servo-on state.

In accordance with aspects of the invention, the determination of the optical power characteristics of the light source is performed while maintaining the actuator in a driving state in which data can be written and read on and from the optical disc.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
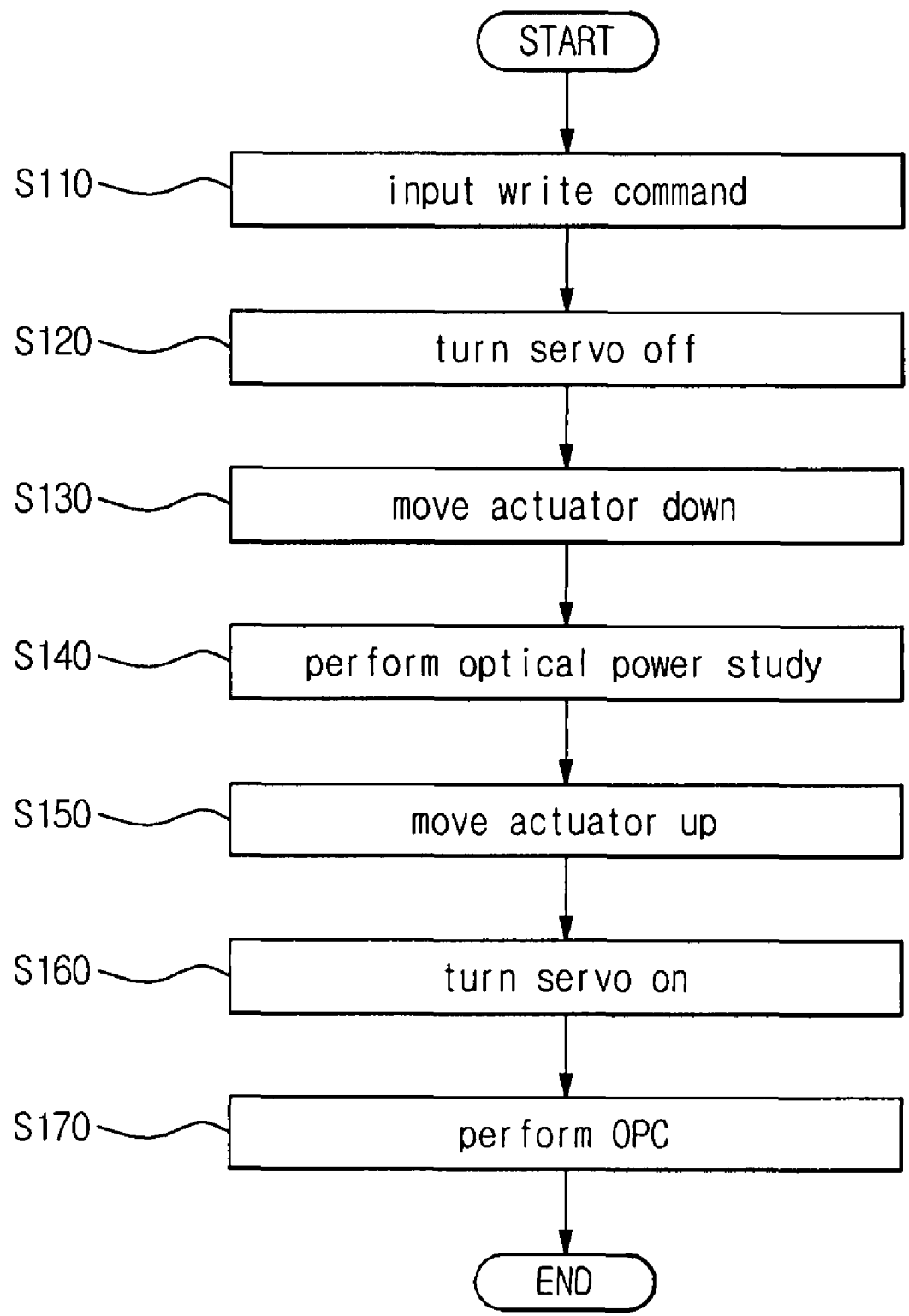
FIG. 1 is a flow chart of a conventional method of performing an optical power study.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
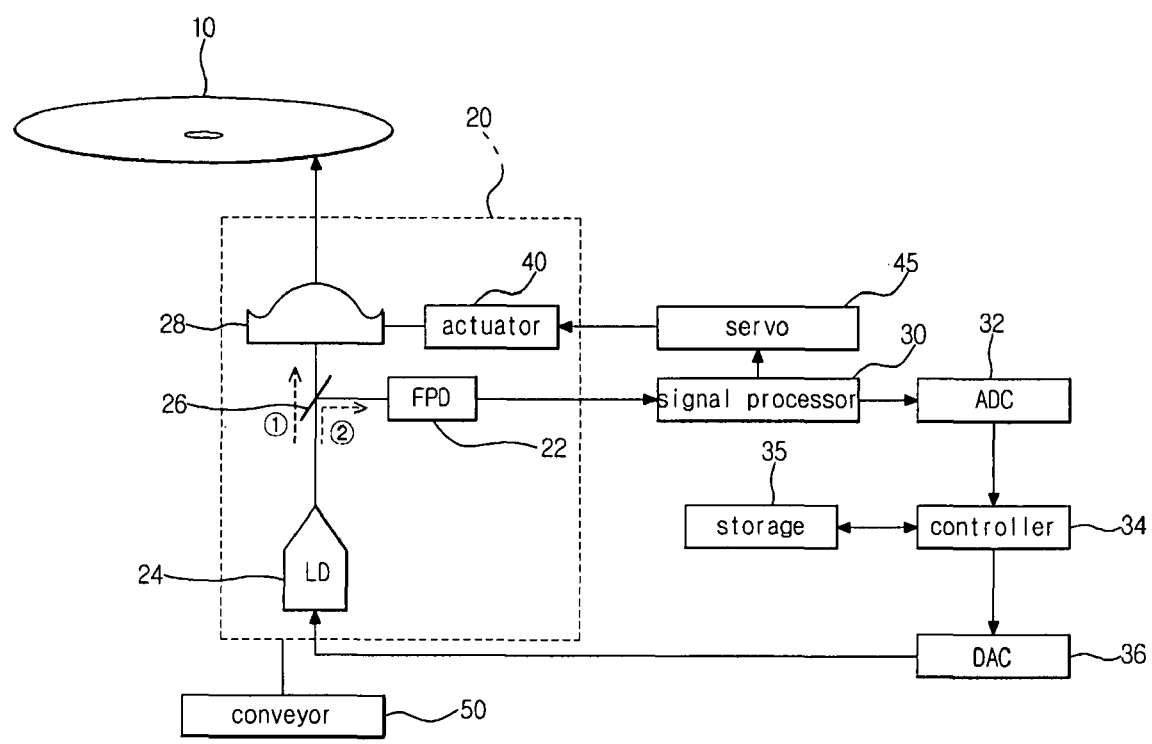
FIG. 2 is a block diagram of an optical disc apparatus according to an embodiment of the present invention.

FIG. 2 is a block diagram of an optical disc apparatus according to an embodiment of the present invention. As shown in FIG. 2, the optical disc apparatus includes an optical pickup 20, a signal processor 30, an analog to digital converter (ADC) 32, a digital to analog converter (DAC) 36, a controller 34, a storage 35, a servo 45, and a conveyor 50. The optical pickup 20 reads and writes data from and on an optical disc 10 by radiating laser beams onto the optical disc 10. To accomplish this, the optical pickup 20 includes an objective lens 28, a beam splitter 26, a laser diode (LD) 24, a front photodiode (FPD) 22, and an actuator 40. The LD 24 is an example of a light source to emit a laser beam corresponding to an input optical power signal. The objective lens 28 focuses a laser beam emitted from the LD 24 onto a surface of the optical disc 10 so that a beam spot is formed on the surface. In order to perform accurate focusing operations, the actuator 40 moves the objective lens 28 vertically under the control of the servo 40. The FPD 22 is an example of an optical power detector that receives part of the laser beam that is emitted from the LD 24 and which outputs a signal corresponding to the optical power of the emitted laser beam. The beam splitter 26 splits the laser beam emitted from the LD 24 into two beams directed to the objective lens 28 and the FPD 22, respectively.

Specifically, the beam splitter 26 splits the laser beam that is emitted from the LD 24 into a beam of direction ① that is radiated onto the optical disc 10 and a beam of direction ② that is incident on the FPD 22 to detect the power of the laser beam.

The FPD 22 in the optical pickup 20 converts a current signal, which is output according to the power of the received laser beam, into a voltage signal and transfers the voltage signal to the signal processor 30. The signal processor 30 samples and holds the voltage signal received from the FPD 22 and separately outputs a writing power level, an erasure power level, and a bias power level.

The ADC 32 converts the erasure power level among the power levels output from the signal processor 30 into a digital signal. For example, the ADC 32 divides a specific range of voltages with a predetermined resolution and converts each voltage into a corresponding power level, such as when a range of 0 to 3.3V is divided with a resolution of 10 bits, 2.5V is converted into a 775th power level. The converted ADC level is then provided to the controller 34 so that the controller 34 determines the power of the laser beam emitted from the LD 24.

The storage 35 includes a Read Only Memory (ROM) that stores a control program that is prepared in advance to control the operation of the optical disc apparatus and a Random Access Memory (RAM) that stores a variety of data produced during the operation of the optical disc apparatus. A digital signal that is produced by the conversion of the optical power of the laser beam that has been emitted according to the optical power signal is stored in the RAM, which is referred to in determining the characteristics of the LD 24.

The DAC 36 converts an optical power signal output from the controller 34 into an analog signal and outputs the analog signal to the LD 24. As is described above, the power of the laser beam emitted from the LD 24 varies depending on temperature. Both the analog signal, into which the DAC 36 converts the optical power signal output from the controller 34, and the power of the laser beam, which is emitted from the LD 24 according to the analog signal, each also slightly vary from one optical disc apparatus to another. Since the characteristics of the LD 24 vary based on the individual characteristics of the optical disc apparatus and temperature, performing an optical power study to determine the optical power characteristics of a laser beam according to the optical power signal from the controller 34 is necessary. For example, the laser beam power characteristics are expressed by a relation between the optical power signal and the laser beam power. The relation may be obtained using optical power signals and the levels of digital signals produced by AD conversion of the powers of laser beams that are emitted according to the optical power signals.

The controller 34 controls the overall operation of the optical disc apparatus according to a control program stored in the storage 35. For example, when a recordable optical disc such as a CD-R is inserted into the optical disc apparatus and a write command is input, the controller 34 then controls the optical disc apparatus to perform an optical power study to determine the optical power characteristics of the LD 24 and to perform Optimum Power Calibration (OPC) to detect the optimal writing power.

Based on an output signal of the signal processor 30, the servo 45 outputs a tracking and focusing control signal, which allows the laser beam to accurately follow the track of the optical disc 10 and which allows the beam spot to be accurately focused on the track. The control signal is outputted to the actuator 40 and controls the vertical and horizontal movement of the objective lens 28 accordingly. This state of the servo 45, in this case, is referred to as a servo-on state, but, of course, the servo 45 may also be in a servo-off state.

The conveyor 50 is a device that includes a feeding motor and a lead screw to move the optical pickup 20 from innermost to outermost sections of the optical disc 10.

During the conventional optical power study methods, a laser beam having a specific power corresponding to the optical power signal is emitted although test data is not written. Therefore, when the optical power study is performed on a position where data has been written, the written data may be damaged. Accordingly, to prevent damage to the written data from occurring, the actuator 40, which is provided to move the lens, is moved down as low as possible and a predetermined range of optical power signals are applied to the LD 24. To accomplish this, turning off the servo used for tracking and focusing control is necessary. In the conventional optical power study methods, however, a long time is required to turn the servo on/off and to move the actuator up/down, thereby increasing the total OPC time or the like.

Figure 3:
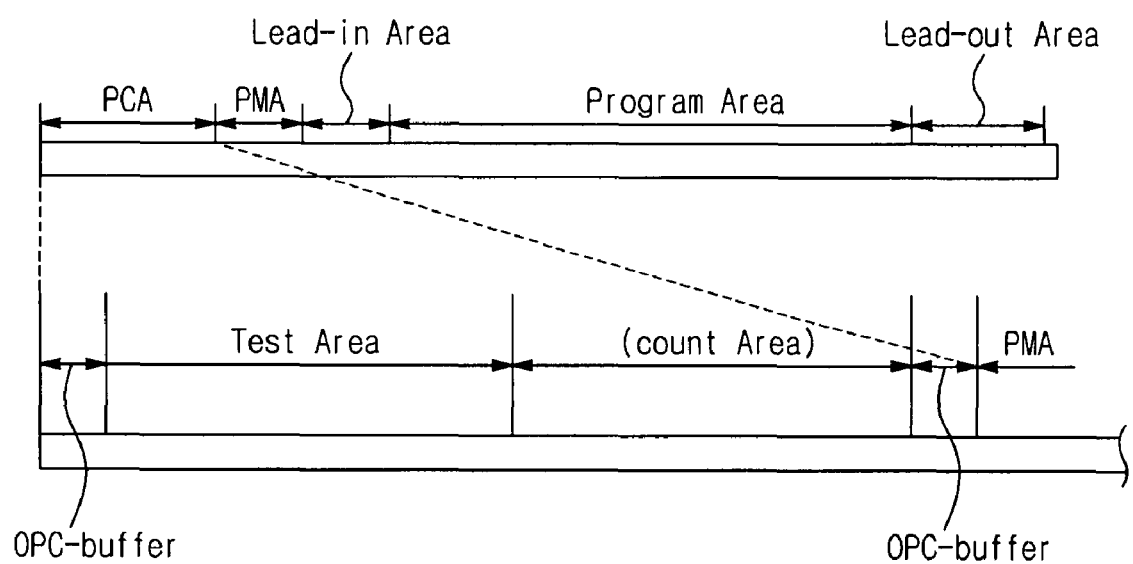
FIG. 3 illustrates an optical disc that includes a PCA, which is a test area where OPC is performed, and OPC-buffer areas.

In contrast, in the present invention, the optical power study is performed after the optical pickup 20 is moved to a specific area of the optical disc, where written data is permitted to be damaged, for example, a PCA where test data is written to detect the optimal writing power. This eliminates the need to turn the servo 45 on/off and to move the actuator 40 up/down to avoid a possible damage of data. The area on which the optical power study may be performed also includes OPC buffer areas that are arranged at either side of the PCA to identify the PCA as shown in FIG. 3. The optical power study may be more safely performed on the OPC buffer areas since no specific data is written on the OPC buffer areas. In fact, the optical power study according to aspects of the present invention may be performed on any area other than the above-mentioned areas when, whether or not data written on the area is damaged, does not matter.

The optical power study according to aspects of the present invention is performed while maintaining the driving state of the actuator 40, so that the OPC to detect the writing power may be successively performed, thereby reducing the required lead-in time and the required total writing power detection time.

Where a write-once optical disc such as a CD-R, a DVD-R, or a BD-R is inserted into the optical disc apparatus, the optical power study is not performed during a lead-in time during which unique information of the disc is collected after the disc is inserted and is instead performed when a write command is input, thereby reducing the time required to perform the optical power study. This makes reducing the capacity of a buffer required to store data to be written during the optical power study possible, thereby reducing the manufacturing costs of the apparatus. In addition, if the optical power study is performed after the operation of seeking a position where an OPC is to be performed and then the optical pickup 20 is moved to the appropriate position, there is no need to additionally seek the position after the optical power study is completed, thereby further reducing the required time.

Figure 4:
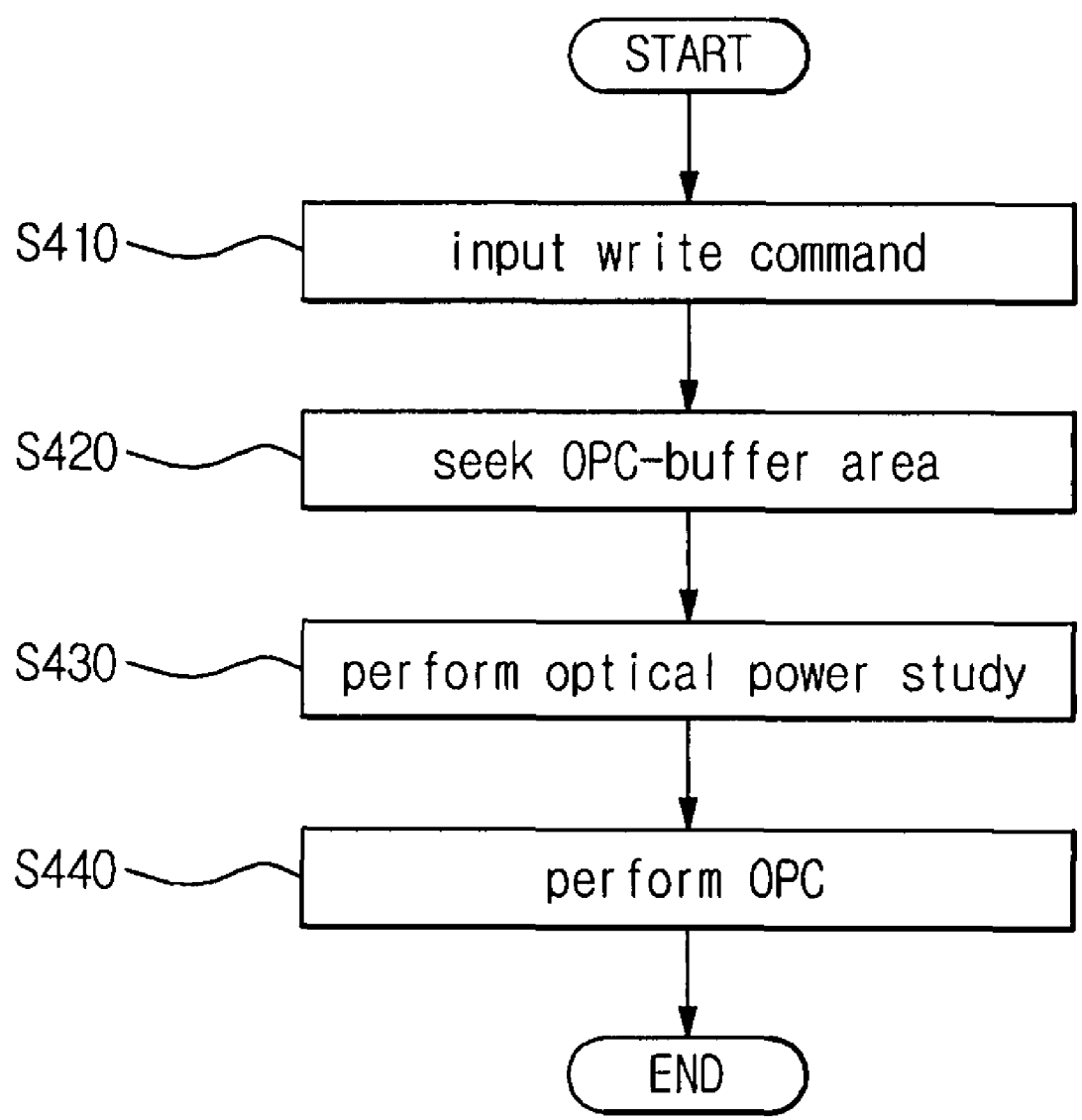
FIG. 4 is a flow chart of a method for performing an optical power study according to an embodiment of the present invention.

FIG. 4 is a flow chart of an example of the optical power study of the present invention. Once a write command is input, the controller 34 controls the optical pickup 20 and the conveyor 50 to seek an OPC-buffer area (S410 and S420). As is described above, since no specific data has been written in the OPC-buffer area, there is no concern about damage of data by laser beams emitted during the optical power study. The controller 34 then performs an optical power study by sequentially applying a predetermined range of optical power signals to the LD 24 and determining optical power characteristics of the LD 24 using optical power signals and digital signals produced by conversion of the optical powers of laser beams that are emitted according to the optical power signals (S430). Since the states of the servo 45 and the actuator 40 are unchanged, OPC is performed to detect the optimal writing power immediately after completion of the optical power study (S440).

As is apparent from the above description, aspects of the present invention provide an optical disc apparatus, a method of performing an optical power study of the optical disc apparatus, and a method of detecting a writing power of the optical disc apparatus, which have a variety of advantages. For example, according to aspects of the present invention, the time required to perform an optical power study and the lead-in time of a disc are each reduced. Aspects of the present invention also permit use of a low-capacity buffer, thereby reducing the manufacturing costs of the apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc apparatus to perform recording and/or reproducing operations onto and/or from an optical disc inserted therein, the apparatus comprising:
   an optical pickup including a light source to emit a laser beam according to an optical power signal, the laser beam having a first part directed onto the optical disc and a second part directed onto an optical power detector to detect an optical power of the emitted laser beam using the second part of the emitted laser beam, and an actuator to drive a lens to form a beam spot on the optical disc;
   a conveyor to move the optical pickup to a location corresponding to a specific area of a recording surface of the optical disc;
   a servo to control movement of the actuator of the optical pickup; and
   a controller to control the conveyor so that the optical pickup is positioned in a specific area of an optical disc and to apply a predetermined range of optical power signals to the light source to perform an optical power study after moving the optical pickup to the location and before performing recording and reproducing operations so as to determine optical power characteristics of the light source using the optical power signal and the detected optical power of the second part of the emitted laser beam while maintaining the actuator in a driving state in which both writing and reading are possible.

2. The optical disc apparatus according to claim 1, wherein the specific area of the optical disc includes a test area where Optimum Power Calibration (OPC) is performed to detect an optimal writing power.

3. The optical disc apparatus according to claim 1, wherein the specific area of the optical disc includes OPC buffer areas that are arranged at either side of a Power Calibration Area (PCA) that is a test area where OPC is performed to detect an optimal writing power.

4. The optical disc apparatus according to claim 1, wherein the driving state of the actuator in which writing and reading is possible corresponds to a servo-on state of the servo.

5. The optical disc apparatus according to claim 4, wherein the controller performs the optical power study while maintaining the servo in the servo-on state.

6. A method of performing an optical power study of an optical disc apparatus comprising an optical pickup, including a light source to emit a laser beam to write and/or read data onto and/or from an optical disc and an actuator to drive a lens to form a beam spot on the optical disc, and a servo to control operations of the optical pickup, the method comprising:
   moving the optical pickup to a location corresponding to specific area of the optical disc;
   applying an optical power signal to the light source to emit a laser beam toward the specific area of the optical disc;
   splitting the laser beam into a first part directed to the optical disc and a second part directed to an optical power detector; and
   determining optical power characteristics of the light source after moving the optical pickup to the location and before writing and reading data onto the optical disc using the optical power signal and a detected optical power of the second part of the emitted laser beam, wherein the optical power study is performed while maintaining the actuator in a driving state.

7. The method according to claim 6, wherein the specific area of the optical disc includes a test area where Optimum Power Calibration (OPC) is performed to detect an optimal writing power.

8. The method according to claim 6, wherein the specific area of the optical disc includes OPC buffer areas that are arranged at either side of a Power Calibration Area (PCA) that is a test area where OPC is performed to detect an optimal writing power.

9. The method according to claim 6, wherein the driving state corresponds to a servo-on state of the servo, in which writing and reading to and from the optical disc is possible.

10. The method according to claim 9, wherein the optical power study is performed while maintaining the servo in the servo-on state.

11. A method of performing an optical power study of an optical disc apparatus comprising an optical pickup, including a light source to emit a laser beam to write and/or read data onto and/or from an optical disc and an actuator to drive a lens to form a beam spot on the optical disc, and a servo to control operations of the optical pickup, the method comprising:
   seeking a test area of an optical disc where test data is to be written to detect an optimal writing power for writing data on the optical disc;
   applying an optical power signal to the light source to emit a laser beam to be split into a first part directed to a found test area of the optical disc and a second part directed to an optical power detector, and determining optical power characteristics of the light source using the optical power signal and an optical power of the second part of the emitted laser beam; and
   performing optimal calibration (OPC) to detect an optimal writing power of the optical pickup, comprising:
      writing test data; and
      reading the written test data and detecting the optimal writing power based on quality of the read signal.

12. The method according to claim 11, wherein the writing of the test data is performed without seeking the test area after the optical power characteristics of the light source are determined.

13. The method according to claim 11, wherein the determination of the optical power characteristics of the light source is performed while maintaining the servo in a servo-on state.

14. The method according to claim 11, wherein the determination of the optical power characteristics of the light source is performed while maintaining the actuator in a driving state.

15. A method of performing an optical power study of an optical disc apparatus comprising an optical pickup, including a light source to emit a laser beam to write and/or read data onto and/or from an optical disc and an actuator to drive a lens to form a beam spot on the optical disc, and a servo to control operations of the optical pickup, the method comprising:
   moving the optical pickup to a location corresponding to specific area of the optical disc;
   applying an optical power signal to the light source to emit the laser beam toward the specific area of the optical disc;
   splitting the laser beam into a first part directed to the optical disc and a second part directed to an optical power detector; and determining optical power characteristics of the light source after moving the optical pickup to the location and before writing and reading test data onto the optical disc using the optical power signal and a detected optical power of the second part of the emitted laser beam with the actuator maintained in a driving state.

16. A method of performing an optical power study of an optical disc apparatus comprising an optical pickup, including a light source to emit a laser beam to write and/or read data onto and/or from an optical disc and an actuator to drive a lens to form a beam spot on the optical disc, and a servo to control operations of the optical pickup, the method comprising:

seeking a test area of an optical disc where test data is to be written;

applying an optical power signal to the light source to emit a laser beam to the found test area;

splitting the laser beam into a first part directed to the optical disc and a second part directed to an optical power detector;

determining optical power characteristics of the light source using the optical power signal and a detected optical power of the second part of the emitted laser beam; and performing optimal calibration (OPC) to detect an optimal writing power of the optical pickup, comprising:
  writing the test data;
  reading the test data and detecting the optimal writing power based on a quality of the read signal; and
  adjusting the optical power signal to the light source based on the optical power characteristics of the light source and the quality of the read signal.

* * * * *